Figure 1:
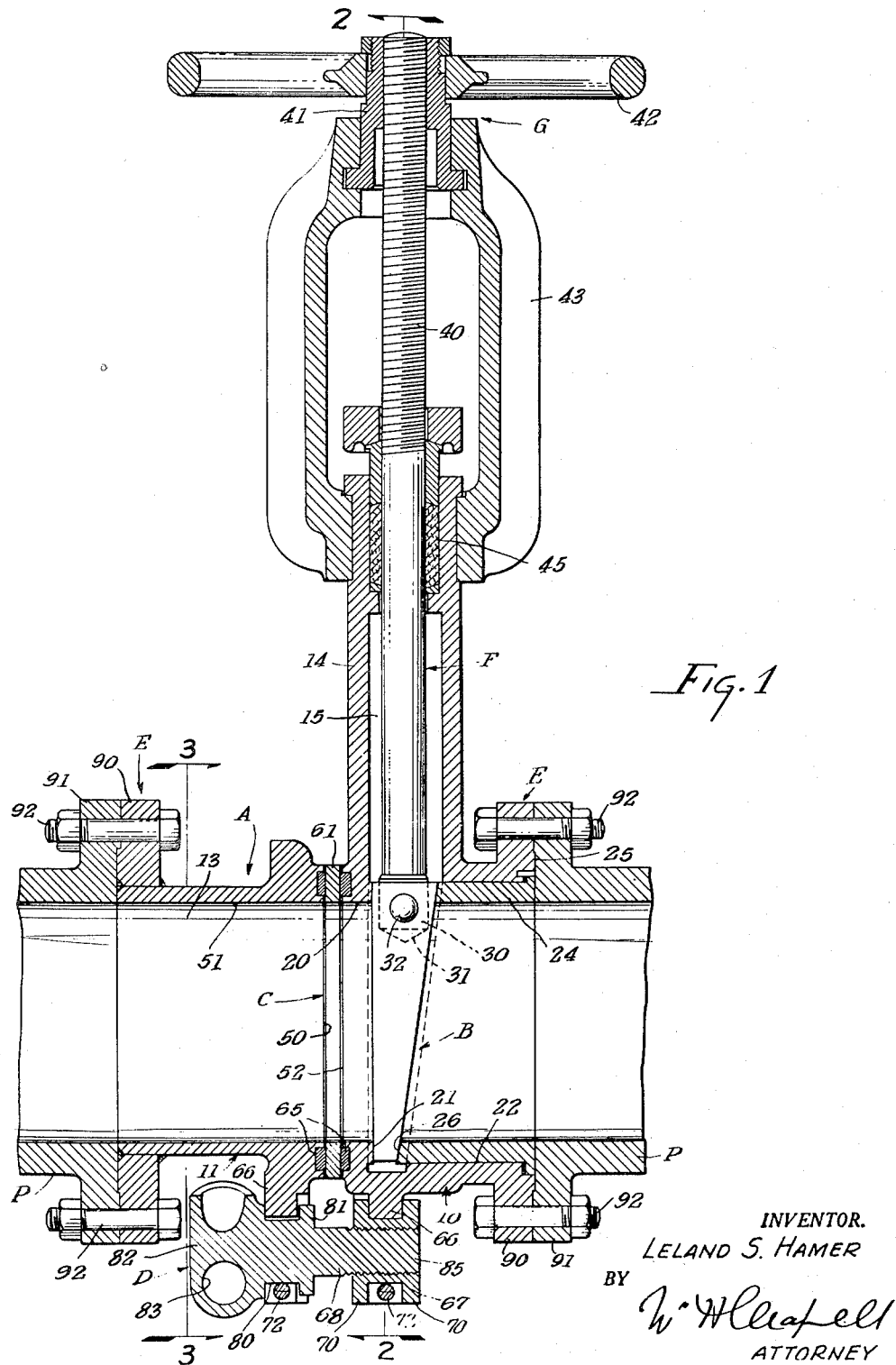

March 7, 1950

L. S. HAMER 2,499,380

FLOW CONTROL

Filed May 21, 1945

2 Sheets—Sheet 1

INVENTOR.
LELAND S. HAMER
BY
W. H. Chapell
ATTORNEY

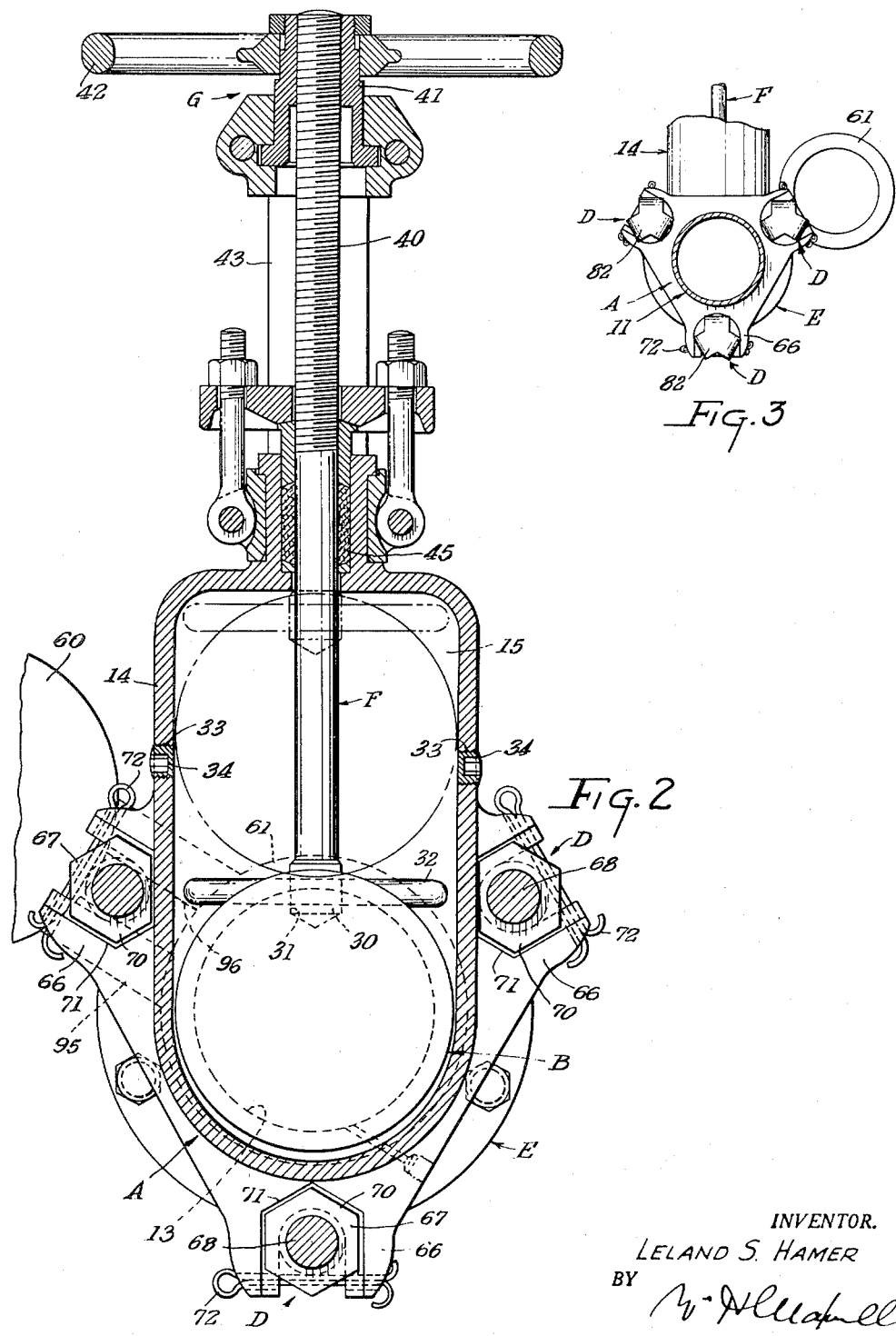

Patented Mar. 7, 1950

2,499,380

UNITED STATES PATENT OFFICE 2,499,380

FLOW CONTROL

Leland S. Hamer, Long Beach, Calif., assignor of one-fourth to Paul A. Dewhirst, Los Angeles, Calif.

Application May 21, 1945, Serial No. 594,851

10 Claims. (Cl. 277—67)

This invention relates to a flow control and it is a general object of the invention to provide a unit of equipment suitable for use in pipe lines or the like, including features heretofore obtainable only in assemblies involving two or more entirely separate devices.

There are many situations, particularly in pipe lines or piping systems, where it is now customary to use a gate valve and a plate device with an orifice fitting or a line blind in adjoining relationship. Such arrangements provide means for cutting off a line through the action of a gate valve and provide means for blinding a line or providing an orifice action depending upon which unit of equipment is in use. Such installations not only involve two expensive, cumbersome units, but are often difficult to install or line up and they invariably occupy a substantial space in the line.

It is a general object of my present invention to provide a unitary structure involving both a gate and a plate, either one or both of which may be arranged in active position as the operator desires. A general object of the present invention is to provide such a unit of apparatus which is very simple of construction and operation and which is compact. The structure of the present invention involves few parts and involves simple operating means and it is compact both in the direction of the line and laterally thereof. By my invention I provide a unit involving a gate which is free of the usual bonnet construction and, therefore, is of minimum height, and I provide a body for handling flow, which body is sectional to embrace a plate and is little, if any, longer than is ordinarily required in the usual fitting required to handle a plate.

Another object of my invention is to provide a simple, unique and compact arrangement of parts wherein the various members requiring operation are readily accessible and in which the parts of the plate handling equipment are related to those of the gate handling equipment so that there is no conflict between them.

The various objects and features of my invention will be fully understood from the following detailed description of a typical preferred form and application of my invention, throughout which description reference is made to the accompanying drawings, in which:

Fig. 1 is a longitudinal vertical detailed sectional view of a unit embodying the present invention showing the gate thereof closed and showing the plate thereof in place with an aperture for handling full flow. Fig. 2 is a detailed transverse sectional view taken substantially as indicated by line 2—2 on Fig. 1 and Fig. 3 is a reduced sectional view of a portion of the apparatus taken substantially as indicated by line 3—3 on Fig. 1.

The construction provided by my present invention includes, primarily, a sectional body A handling a closure gate B and a plate C. The structure further includes means D for actuating the sections of the body to shift them axially relative to each other, means E at the ends of the body for making connection with pipe line sections P or the like, and also means incidental to the gate B, as for instance a stem F for operating it and means G for operating the stem.

In accordance with the broader principles of my invention I may employ a gate B and its essential parts such as the stem F and operating means G of various forms or designs, and likewise I may employ plates C of various forms or types. In the drawings I have illustrated certain general features of the gate construction which are more fully set forth and are claimed in my co-pending application entitled "Gate valve," Serial No. 594,995, filed on even date herewith.

The body A which I have provided is in the nature of an elongate tubular structure divided transversely intermediate its ends so that it is sectional, having what I will term a gate section 10 and a clamp section 11. The body formed by the two sections 10 and 11 forms a flow passage 13 which, in most designs, will be a straight passage preferably round in cross-sectional configuration. It is to be understood, however, that the passage may be varied as to shape, both longitudinally and in cross-section as circumstances may require. The gate section 10 of the body is provided with a lateral extension 14 which forms a gate chamber 15, which chamber intersects the passage 13 through the body. The portion of the body section 10 in the direction of the clamp section 11 from the chamber 15 I will term the inner end portion of the section 10, while that part of the section 10 from the chamber 15 to the free end of the section 10 I will call the outer end portion thereof.

The inner end portion of the section 10 is preferably very short or of limited length, and it has a bore 20 defining a section or portion of the fluid passage. The bore 20 is somewhat smaller in diameter than the gate B which is in the form of a disc and a flat transverse face 21 is established where the bore 20 communicates with the gate chamber 15. The face 21 in the preferred form of the invention is a flat finished face normal to the longitudinal axis of the passage 13 through the body.

The outer end portion of the body 10 is provided with a bore 22 which I will term a counterbore and which is slightly larger in diameter than the gate B. An insert or liner 24 is carried in the bore 22 and extends from the free end 25 of the free or outer end of the body section 10 inward to the chamber 15 where it is provided with a flat seating face 26 adapted to be engaged by the gate. In the particular preferred form of the invention illustrated the face 26 is formed at an angle or is inclined and opposes the face 21, so that these two faces define a tapered opening into which the gate B fits. When the gate is closed as shown in Fig. 1, it engages or fits against both the face 21 and the face 26, and in practice either or both of these engagements may be established as the sealing engagement of the gate construction. The particular type of liner just referred to is more specifically described and is claimed in my application above-identified.

The gate is in the nature of a disc and is wedge-shaped. The diameter of the gate is made slightly smaller than the bore 22 so that the gate can be arranged in and removed from the body through the bore 22 when the liner is removed therefrom. The disc-shaped gate is beveled or made wedge-shaped to fit the space established between the faces 21 and 26.

The stem F provided for operating the gate enters the body through the extension 14 thereof and the gate is connected to the lower or inner end of the stem by a releasable fastening means which is fully set forth and claimed in my said companion application. This means includes, generally, an end 30 on the stem fitting a socket 31 in the gate and a pin 32 arranged transversely of the stem and extending through a portion of the gate and through the end of the stem to retain the end 30 in the socket 31. The pin 32 can be arranged in place and removed from the other parts through access openings 33 in the extension 14. The access openings are normally closed by plugs 34.

The operating means G for the stem F may be of any suitable construction. In the drawings I have shown threads 40 on the upper end portion of the stem above the body extension 14 and I have shown a nut 41 engaging the threads 40 and provided with a hand wheel 42. The nut is rotatably carried by a frame 43 attached to and projecting upward from the body extension 14. A suitable packing means 45 is provided around the stem F where it passes into the body extension 14.

The clamp section 11 of the body A is a tubular member with a flat inner end 50 normal to the longitudinal axis of the flow passage 13 and it has a continuous bore 51 corresponding in size to the bore 20 in body section 10. The end 50 of the body section 11 faces or is opposed to the flat finished inner end 52 of the gate section 10 of the body which is also normal to the longitudinal axis of the flow passage. The faces 50 and 52 being flat and opposed are suitable for the reception of the plate C. In the ordinary situation the plate C will be a blinding plate or an orifice plate and may be a plain, thin plate of simple design. In the drawings I have shown a plate C with one plain end 60 suitable for blinding and an apertured end 61 suitable for establishing full flow through the structure. In Figs. 1 and 2 of the drawings I have shown the plate end 61 in operating position, whereas in Fig. 3 I have shown the plain end 60 in operating position. Either end of the plate will fit between the ends or faces 50 and 52 of the body sections and since the inner end portion of the body section 10 is of limited axial extent the plate part which is in operating position will be close to the gate B, so there is a very small chamber between them. It may be desirable in practice to provide packing means for making tight joints between the body sections and the plate. In the drawings I have shown grooves in the faces 50 and 52 carrying bodies of packing 65 which engage the plate to seal therewith.

The means D provided for actuating the two sections 10 and 11 of the body acts to shift or operate the sections axially to move them toward each other into clamping engagement with the plate or to spread them apart to free the plate.

The means D shown in the drawings involves, generally, a plurality of lugs 66 projecting from the inner end portion of each body section, nuts 67 carried by the projections of one body section and screws 68 carried by the lugs of the other body section, the lugs of the two sections being arranged opposite each other to accommodate the other parts in the manner illustrated throughout the drawings. The lugs 66 are preferably radially disposed projections on the inner end portions of the body sections notched to accommodate the nuts 67 and screws 68. The nuts 67 are spool-like elements rotatably supported in the lugs of one body section, say for instance, the body section 10. The flanges at the ends of the nuts engage the sides of the lugs to prevent axial movement of the nuts without interfering therewith. These flanges 70 are preferably polygonal and engage polygonal parts 71 in the lugs so the nuts are held against rotation. Retainers in the form of keys 72 act to releasably retain the nuts in their supporting lugs.

The screws 68 are carried by the lugs 66 of the other section, for instance, the body section 11, and have neck portions 80 seated in the lugs for rotation, and have flanges 81 and heads 82 at opposite sides of the lugs to prevent axial movement relative to the lugs. The heads 82 are formed for the reception of suitable operating tools, say, for instance, bars, in which case they have bar-receiving openings 83. Keys 72 like those above referred to are provided to retain the necks 80 of the screws in their supporting lugs. The projecting end portions 85 of the screws are threaded into the nuts 67 occurring opposite them. With the construction just described rotation of the screws 68 through turning of their heads 82 causes the body sections 10 and 11 to be moved relative to each other axially of the flow passage 13, or, that is, axially of the body either to clamp the body sections to plate C or to spread the body sections so that they free a plate held between them.

In order to effectively distribute the clamping strains I prefer to equally space the several units of the means D around the body structure. In the case illustrated I provide three units of the means D, or in other words, three screws 68 and cooperating nuts 67, and I arrange these units with one at the bottom of the structure or diametrically opposite the body extension 14 and the other two adjacent opposite parts or edges of the body extension 14, as will be clearly seen in Figs. 2 and 3 of the drawings.

With the construction and arrangement of parts that I have provided either portion or either end of the plate, that is, either part 60 or 61, can be passed into and out of operating position between adjacent units of means D. This makes it possible to change plates or to reverse the plate end for end without detaching any parts of the construction. Further, in accordance with my invention I couple or tie the plate to the structure by means of one of the units of means D. In the preferred construction I employ a plate having the end parts 60 and 61 connected by a neck 95 and I provide a slot 96 in the neck to pass one of the screws 68 so that the plate is slidably, pivotally held by means of that screw. With this construction the plate can be slid and pivoted so that it can be changed end for end without danger of it becoming detached from the structure.

The means E provided at opposite ends of the body assembly for connecting the body with pipe line sections P, or the like, may be any suitable form of connection. In the drawings I have shown flanges 90 on the outer ends of the body sections 10 and 11, respectively, to receive companion flanges 91 on the ends of the pipe sections, and I show bolts 92 connecting the flanges 90 and 91.

From the foregoing description and from the drawings it will be observed that I have, by my present construction, provided in one simple, compact unit a gate as well as a plate construction for controlling or handling flow. Further, it is to be noted that the construction that I have provided is extremely compact, both axially of the flow passage and laterally thereof. By providing the plate in close coupled relationship to the gate, and providing the means G which I have illustrated, the structure is minimized as to length, and by providing a gate construction free of the usual bonnet arrangement I minimize the lateral extent of the construction, at the same time providing a highly efficient, practical, gate.

Another and important feature attained by the construction and combination that I have provided is the manner in which the gate section of the body can be removed to facilitate repair of the parts of that unit of the construction. The means D can be readily disengaged and quickly operated to release the plate C so that it can be withdrawn from the construction without materially disturbing the axial position of the body sections 10 and 11, that is, it is merely necessary to move the body sections apart slightly in order to release the plate. When the plate has been removed the keys 72 of the means D can be removed allowing removal of the screws 68 and their nuts 67. The body sections 10 and 11 are then separated with a space between them corresponding to the thickness of the plate C. By removing the bolts 92 joining body section 10 with the pipe section P to which it is connected, the body section 10 is freed so that it can be readily withdrawn from the line. All of this can be accomplished quickly and without resorting to wedging devices and without prying or straining the line in any way, as is ordinarily necessary to remove a part such as a gate valve. By providing the space between the body sections 10 and 11, which space is normally occupied by the plate C, I provide ample clearance in the structure for manipulating the gate element in the desired manner.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described by invention, I claim:

1. In a structure of the character described, a flow controlling plate, a flow controlling gate, a tubular body carrying the plate and the gate and including two relatively movable sections with pipe coupling means at their outer ends, one a gate section having a laterally disposed gate receiving chamber defined at one end by a flat wall located at the inner end of said section, said wall being disposed in a plane normal to the axis of the body and having a flow opening therethrough, the other body section having an inner end opposed to and spaced from the exterior of said wall axially of the body, the gate being operable in the chamber and closing against the interior of said wall and the plate being engaged between the body sections and with the inner ends thereof, and means operating the body sections relative to each other to clamp them to the plate including coupling units circumferentially spaced around the body at the sides and lower portion thereof leaving the upper portion unrestricted for passage of the plate into and out of position between the body sections.

2. In a structure of the character described, a flow controlling plate, a flow controlling gate, a tubular body carrying the plate and the gate and including two relatively movable sections with pipe coupling means at their outer ends, one a gate section having a laterally disposed gate receiving chamber defined at one end by a flat wall located at the inner end of said section, said wall being disposed in a plane normal to the axis of the body and having a flow opening therethrough, the other body section having an inner end opposed to and spaced from the exterior of said wall axially of the body, the gate being operable in the chamber and closing against the interior of said wall and the plate being engaged between the body sections and with the inner ends thereof, and means operating the body sections relative to each other to clamp them to the plate including a plurality of coupling units between the body sections at the exterior thereof and spaced substantially equal distances apart around the body and also substantially equal distances from the center of the body, the uppermost of said units being spaced apart to pass the plate into and out of position between the body sections.

3. In a structure of the character described, a flow controlling plate, a flow controlling gate, a tubular body carrying the plate and the gate and including two relatively movable sections with pipe coupling means at their outer ends, one a gate section having a laterally disposed gate receiving chamber defined at one end by a flat wall located at the inner end of said section, said wall being disposed in a plane normal to the axis of the body and having a flow opening therethrough, the other body section having an inner end opposed to and spaced from the exterior of said wall axially of the body, the gate being operable in the chamber and closing against the interior of said wall and the plate being engaged between the body sections and with the inner ends thereof, annular seals carried by the inner of the body sections concentric therewith and projecting therefrom to cooperatively engage the plate, and means operating the body sections relative to each other to clamp the seals to the plate.

4. In a structure of the character described, a flow controlling plate, a flow controlling gate, a tubular body carrying the plate and the gate and including two relatively movable sections with pipe coupling means at their outer ends, one a gate section having a laterally disposed gate receiving chamber defined at one end by a flat wall located at the inner end of said section, said wall being disposed in a plane normal to the axis of the body and having a flow opening therethrough, the other body section having an inner end opposed to and spaced from the exterior of said wall axially of the body, the gate being operable in the chamber and closing against the interior of said wall and the plate being engaged between the body sections and with the inner ends thereof, and means operating the body sections relative to each other to clamp them to the plate, the gate section having a detachable tubular insert entered in it from the outer end and having an inclined inner end at the chamber engaged by the gate and cooperating therewith to force the gate into sealing engagement with the first mentioned wall.

5. In a structure of the character described, a flow controlling plate, a flow controlling gate, a tubular body carrying the plate and the gate and including two relatively movable sections with pipe coupling means at their outer ends, one a gate section having a laterally disposed gate receiving chamber defined at one end by a flat wall located at the inner end of said section, said wall being disposed in a plane normal to the axis of the body and having a flow opening therethrough, the other body section having an inner end opposed to and spaced from the exterior of said wall axially of the body, the gate being operable in the chamber and closing against the interior of said wall and the plate being engaged between the body sections and with the inner ends thereof, and a plurality of threaded elements circumferentially spaced around the body at the exterior thereof and connecting the body sections and operating them relative to each other, the uppermost of said elements being spaced apart to pass the plate vertically into and out of operating position between the body sections.

6. In a structure of the character described, a flow controlling plate, a flow controlling gate, a tubular body carrying the plate and the gate and including two relatively movable sections with pipe coupling means at their outer ends, one a gate section having a laterally disposed gate receiving chamber defined at one end by a flat wall located at the inner end of said section, said wall being disposed in a plane normal to the axis of the body and having a flow opening therethrough, the other body section having an inner end opposed to and spaced from the exterior of said wall axially of the body, the gate being operable in the chamber and closing against the interior of said wall and the plate being engaged between the body sections and with the inner ends thereof, and means operating the body sections relative to each other to clamp them to the plate including, a plurality of tie members between the body sections and spaced circumferentially thereof, the plate being movable between adjacent tie members and coupled to the body by one of the tie members.

7. In a structure of the character described, a flow controlling plate, a flow controlling gate, a tubular body carrying the plate and the gate and including two relatively movable sections with pipe coupling means at their outer ends, one a gate section having a laterally disposed gate receiving chamber defined at one end by a flat wall located at the inner end of said section, said wall being disposed in a plane normal to the axis of the body and having a flow opening therethrough, the other body section having an inner end opposed to and spaced from the exterior of said wall axially of the body, the gate being operable in the chamber and closing against the interior of said wall and the plate being engaged between the body sections and with the inner ends thereof, and means operating the body sections relative to each other to clamp them to the plate including a plurality of tie members between the body sections at the exterior thereof and spaced apart circumferentially of the body, the uppermost of said tie members being spaced apart horizontally to pass the plate vertically into and out of position between the body sections, one of said uppermost tie members engaging the plate and coupling it with the body.

8. In a structure of the character described, a flow controlling plate, a flow controlling gate, a tubular body carrying the plate and the gate and including two relatively movable sections with pipe coupling means at their outer ends, one a gate section having a laterally disposed gate receiving chamber defined at one end by a flat wall located at the inner end of said section, said wall being disposed in a plane normal to the axis of the body and having a flow opening therethrough, the other body section having an inner end opposed to and spaced from the exterior of said wall axially of the body, the gate being operable in the chamber and closing against the interior of said wall and the plate being engaged between the body sections and with the inner ends thereof, and means operating the body sections relative to each other to clamp them to the plate including, three screw couplers spaced circumferentially at the exterior of the body and extending axially of the body and connecting the inner end portions of the body sections, there being a screw coupler at the bottom of the body and one at each side thereof and the plate being shiftable between adjacent couplers to move into and out of position between the body sections.

9. In a structure of the character described, a flow controlling plate, a flow controlling gate, a tubular body carrying the plate and the gate and including two relatively movable sections with pipe coupling means at their outer ends, one a gate section having a laterally disposed gate receiving chamber defined at one end by a flat wall located at the inner end of said section, said wall being disposed in a plane normal to the axis of the body and having a flow opening therethrough, the other body section having an inner end opposed to and spaced from the exterior of said wall axially of the body, the gate being operable in the chamber and closing against the interior of said wall and the plate being engaged between the body sections and with the inner ends thereof, and means operating the body sections relative to each other to clamp them to the plate including, circumferentially spaced units each having a set of lugs projecting from the body sections and aligned longitudinally thereof, the lugs having outwardly opening sockets therein, a nut held against rotation and also against axial movement in one lug and a threaded member held for rotation and against axial movement in the other lug and being threaded to the nut.

10. In a structure of the character described, a flow controlling plate, a flow controlling gate, a tubular body carrying the plate and the gate and including two relatively movable sections with pipe coupling means at their outer ends, one a gate section having a laterally disposed gate receiving chamber defined at one end by a flat wall located at the inner end of said section, said wall being disposed in a plane normal to the axis of the body and having a flow opening therethrough, the other body section having an inner end opposed to and spaced from the exterior of said wall axially of the body, the gate being operable in the chamber and closing against the interior of said wall and the plate being engaged between the body sections and with the inner ends thereof, a stem carrying and operating the gate and extending laterally of the body, and means operating the body sections relative to each other to clamp them to the plate including, coupling units circumferentially spaced around the body at the exterior thereof, adjacent coupling units being spaced to pass the plate into and out of position between the body sections, the longitudinal axis of the stem being in the plane of the gate.

LELAND S. HAMER.

REFERENCES CITED

The following references are of record in the file of this patent:

UNITED STATES PATENTS

| Number | Name | Date |
| --- | --- | --- |
| 38,138 | Bond | Apr. 7, 1863 |
| 275,798 | Beaumont | Apr. 17, 1883 |
| 759,448 | Kiser | May 10, 1904 |
| 1,020,449 | Riggin | Mar. 19, 1912 |
| 1,502,473 | Joule | July 22, 1924 |
| 2,214,959 | Hamer | Sept. 17, 1940 |
| 2,339,970 | Young | Jan. 25, 1944 |
| 2,396,893 | Hamer | Oct. 16, 1945 |